Oct. 18, 1927.
F. G. CORNELL, JR
1,646,013
PLUG VALVE
Filed Jan. 16, 1925
2 Sheets-Sheet 1
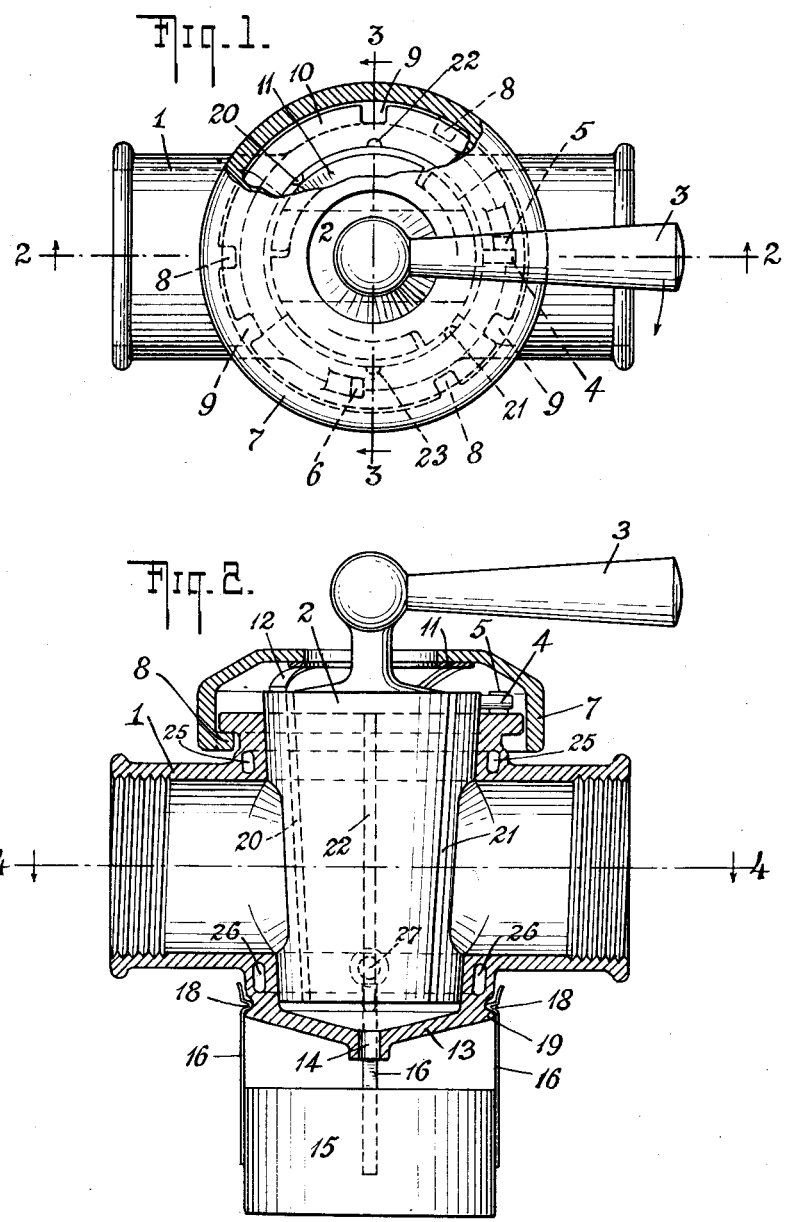
WITNESS
G. V. Rasmussen
INVENTOR
FRITZ G. CORNELL JR.
BY
Miesen Schrenk
ATTORNEYS

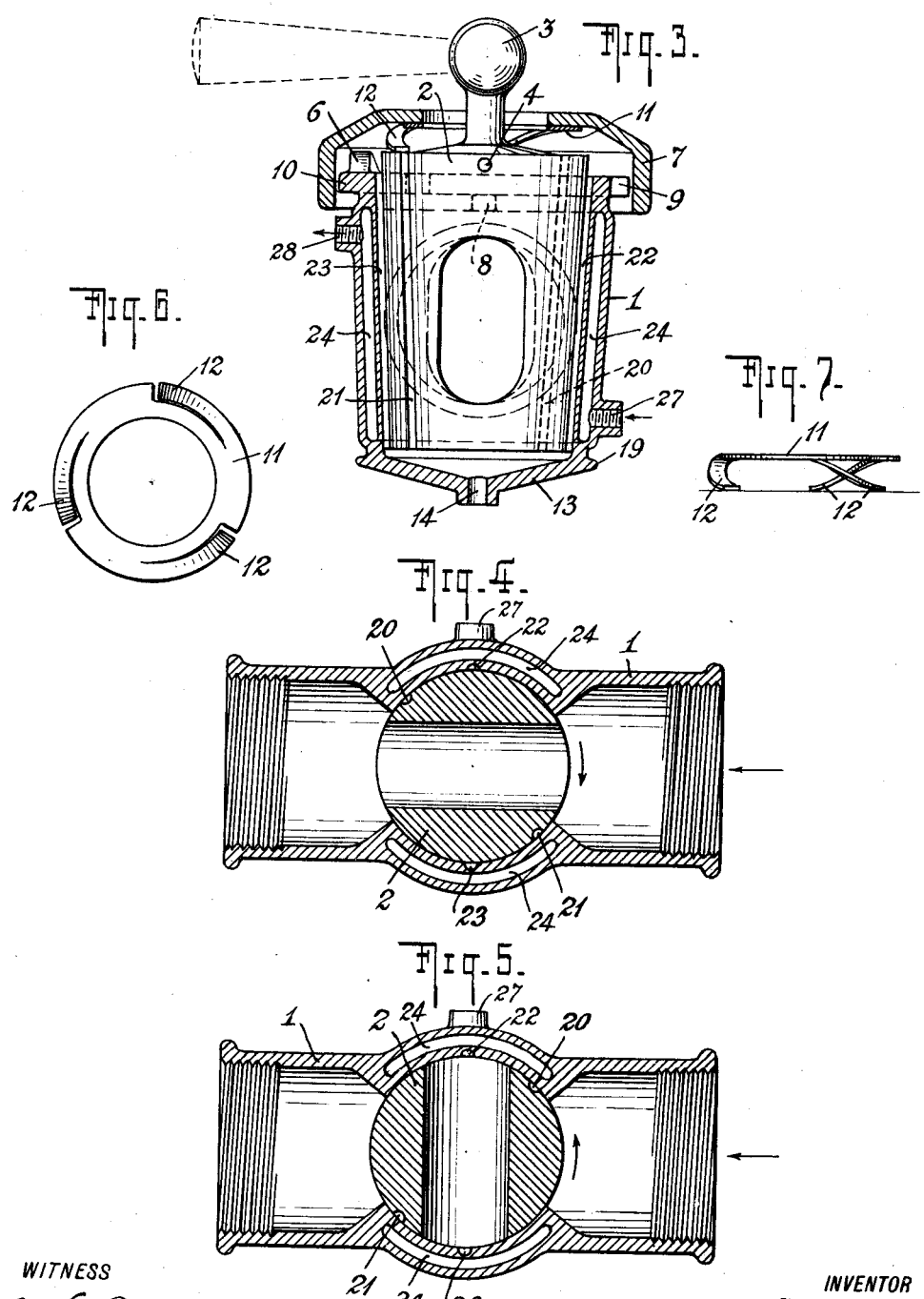

Patented Oct. 18, 1927.

1,646,013

UNITED STATES PATENT OFFICE.

FRITZ G. CORNELL, JR., OF CALDWELL, NEW JERSEY, ASSIGNOR TO W. H. SHEFFIELD, OF NEW YORK, N. Y.

PLUG VALVE.

Application filed January 16, 1926. Serial No. 81,658.

My invention relates to plug valves for use in connection with pipe lines which conduct milk, for instance, from storage or Pasteurizing tanks to the bottling machines. The object of my invention is to prevent leakage past the valve, when closed, into the portion of the pipe line controlled by the valve.

While my invention is not limited to use in apparatus for the treatment or bottling of milk, it is particularly adapted for such purpose. Milk is an organic substance which is an excellent culture medium for bacteria, many of them hostile to the human organism. This fact is so clearly recognized that the health authorities of all, or substantially all, of the cities of the United States provide for strict inspection of bottled milk to make sure that it contains no, or substantially no, harmful bacteria. When milk is bottled in larger bottling establishments, it is first filtered and otherwise purified and, in many cases, Pasteurized, and then led from the storage, filtering or Pasteurizing tank through a pipe to the place of bottling. In many cases a main pipe line leads to the place of bottling, such pipe line being provided with branch pipes, each of which leads to a filtering, storage or Pasteurizing tank. Each of the branch lines and also the main pipe line is provided with at least one plug valve to control the flow of milk. Plug valves contain a minimum number of parts arranged to be readily disassembled for cleaning and readily reassembled. It has, however, been found in practice to be almost impossible to prevent milk from being trapped in the plug passage, or from leaking past a closed plug valve between the plug and its casing and thus passing into the pipe beyond the valve and into the main pipe line, especially when the milk is conducted to the valve under high pressure. If the branch pipe line or main pipe line is out of use for a comparatively short time, the milk which has leaked thereinto will become contaminated by colonies of bacteria and such colonies will then, when milk is again turned in, be carried into the bottled milk and, especially by leading to additional bacterial growth therein, contaminate the same.

My invention, broadly speaking, contemplates the provision of means within the plug valve for draining away milk which tends to leak past the valve by making it flow entirely away from the valve and pipe line. A specific embodiment of my invention illustrating but not limiting the same is shown in the annexed drawings in which Fig. 1 is a plan view of my valve in open position, Fig. 2 a partial section on the line 2—2 of Fig. 1, Fig. 3 a partial section on the line 3—3 of Fig. 1, Fig. 4 a partial section on the line 4—4 of Fig. 2, Fig. 5 the same as Fig. 4 but with the valve shown in closed position, Fig. 6 a plan view and Fig. 7 a side view of a spring-finger ring adapted to be used with a holding cap to seat the plug tightly within its casing.

My plug valve comprises a casing 1, plug 2 and handle 3 of usual construction. The plug is preferably provided with a projection 4 adapted to abut against stops 5, 6 arranged on the casing in such a manner as to permit only a quarter turn of the plug, that is to say, a turn from exact open position to complete closed position. As the milk is frequently under pressure sufficiently high to lift the plug from its seat, a centrally apertured holding cap 7 provided with projections 8 adapted to be inserted through openings 9 in a flange 10 on the casing is provided. To the lower surface of this cap is attached by suitable means, such as welding or riveting, a spring-finger ring 11 whose individual fingers 12 press yieldingly upon the plug so as to hold it in place and yet permit it to be turned without excess of friction.

The part of the casing immediately below the plug is preferably equipped with a closing member 13 provided with a central aperture 14 which may discharge into a container 15 which container may, if desired, be suspended from the casing, for instance by spring-fingers 16, provided with beads 18 adapted to cooperate with bead 19 on the casing.

The plug 2 is provided with grooves 20, 21 extending from the lowermost portion to preferably the uppermost portion of the plug and of sufficient depth to drain off any liquid, for instance milk, which may pass thereinto between the plug and its casing and to permit it to flow downwardly to and through the opening 14 into container 15, thus draining away from the valve any liquid which might otherwise leak past the valve. These grooves should, of course, preferably be so placed that as the valve is turned from closed to open position and vice versa, they will at all times be covered by the plug seat as otherwise milk would leak therethrough directly from the afferent pipe and it would be impossible to keep the valve open only part way without such unnecessary leakage. With the valve constructed as shown in Fig. 1 to be turned only through the lower right hand quadrant, the preferred position of grooves 20 and 21 is that shown in Figs. 4 and 5.

In order to permit the escape of milk trapped within the plug passage when the valve is closed, grooves 22 and 23 are provided in the casing. These grooves should be located in such portions of the casing as are in line with the plug passage when the valve is closed, and should extend from the lowermost portion of the plug preferably to the uppermost portion thereof. Care should, of course, be taken that the grooves are not so located that when the valve is in any partially open position, milk can pass thereto freely from the afferent pipe, through the plug passage.

With the grooves arranged as shown in Figs. 4 and 5, the plug valve will function as follows, assuming that milk flows, or tends to flow, to the valve in the direction of the arrows; when the valve is in open position as shown in Fig. 4, the milk will flow freely through the plug passage, and there is therefore no tendency to leak between the plug and its casing. When the plug has been turned to closed position, as shown in Fig. 5, some milk will have been trapped in the valve passage, and this will flow down through grooves 22 and 23 to member 13, and out of opening 14, into container 15. Milk which leaks in between the plug and its casing will flow into groove 20 or groove 23 and will therein flow downwardly until it reaches container 15. If when the valve is closed there is any pressure in the efferent pipe towards the valve, leakage will be taken care of in a similar manner by grooves 21 and 22.

In order to permit free flow of the milk down the grooves, they should be freely open to the atmosphere at both ends. The simplest means of effecting this result is to have the grooves extend from top to bottom of the plug or casing, as the case may be.

It is obvious that either grooves 20 and 21, or 22 and 23 may be omitted, and leakage still taken care of. If grooves 20 and 21 are omitted, both leakage and the trapped milk will be taken care of.

My plug cock casing may, if desired, be provided with a chamber or chambers, adapted to receive a heating or cooling medium. The cock shown in the drawings is provided with chambers 24, 24 connected by passages 25, 25 and 26, 26, constituting practically a single chamber, provided with inlet opening 27 and outlet opening 28 for the admission and escape of steam, hot or cold water, or the accommodation of electric connections with an electric heating device which may be located within the chamber. If such plug cock is used in close proximity to a Pasteurizing tank, for instance to control the flow of Pasteurized milk therefrom, water of Pasteurizing temperature may be circulated through the chamber 24, 24 to complete the destruction of any bacteria in the milk which may pass between the plug and its seat and remain as a film on such portions of the plug surface as are exposed to the flow of milk when the plug is again opened, or may have remained within the plug opening.

Various changes may be made in the construction shown without departing from the spirit of my invention. For instance, the grooves 20 and 21 may be arranged in whole or in part in the casing instead of in the plug, provided they are in such position that milk will not flow freely therethrough when the plug is in partially, or completely, open position, and some portion of grooves 22 and 23 may be located in the plug instead of the casing.

I claim:

1. In a plug cock, a plug, a casing having a plug seat provided with drainage grooves extending the full height of the plug, a closure member below said plug having an outlet communicating with said grooves, and a cap secured to said casing above said plug and having an aperture communicating with said grooves.

2. In a plug cock, a casing having a plug seat provided with a drainage groove adapted to drain liquid from said seat, a plug having a passage and a drainage groove at one side of said passage, the groove in the casing being so arranged that when the plug is in the closed position it communicates freely with such passage and with the atmosphere, said casing being provided with an outlet for the liquid drained by said grooves, and means to support a receptacle for said liquid in detachable relation.

FRITZ G. CORNELL, JR.